United States Patent
Lee et al.

(10) Patent No.: US 11,195,299 B2
(45) Date of Patent: Dec. 7, 2021

(54) IMAGE PROCESSING DEVICE, IMAGE PROCESSING METHOD AND STORAGE MEDIUM

(71) Applicant: NEC Corporation, Tokyo (JP)

(72) Inventors: Kapik Lee, Tokyo (JP); Takashi Shibata, Tokyo (JP); Atsushi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 104 days.

(21) Appl. No.: 16/644,217

(22) PCT Filed: Sep. 12, 2017

(86) PCT No.: PCT/JP2017/032832
§ 371 (c)(1),
(2) Date: Mar. 4, 2020

(87) PCT Pub. No.: WO2019/053770
PCT Pub. Date: Mar. 21, 2019

(65) Prior Publication Data
US 2021/0090290 A1     Mar. 25, 2021

(51) Int. Cl.
*G06T 7/00*     (2017.01)
*G06T 7/73*     (2017.01)
(Continued)

(52) U.S. Cl.
CPC ............ *G06T 7/74* (2017.01); *G06K 9/0014* (2013.01); *G06K 9/6202* (2013.01);
(Continued)

(58) Field of Classification Search
None
See application file for complete search history.

(56) References Cited

U.S. PATENT DOCUMENTS

2001/0033683 A1* 10/2001 Tanaka .................... G06T 7/001
382/149
2007/0159627 A1* 7/2007 Johnson ............. G01N 15/1463
356/335
(Continued)

FOREIGN PATENT DOCUMENTS

JP    2018-526754 A    9/2018
WO   2014/084255 A1   6/2014
(Continued)

OTHER PUBLICATIONS

International Search Report for PCT Application No. PCT/JP2017/032832, dated Sep. 12, 2017.
(Continued)

*Primary Examiner* — Delomia L Gilliard
(74) *Attorney, Agent, or Firm* — Sughrue Mion, PLLC (57) ABSTRACT

An image processing device according to an aspect of the present invention includes: at least one memory storing a set of instructions; and at least one processor configured to execute the set of instructions to: extract a cluster image including a cluster of particles from a particle image; estimate particle density of the cluster image; determine numbers based on the particle density, and synthesize a second dictionary image from first dictionary images having densities each being equal to the numbers, the first dictionary images being images of particles of which positions is obtained; match the second dictionary image with the partial image, and determine positions of particles in the cluster image based on a result of the matching and the positions of particles of the first dictionary images; and output the determined positions of particles.

15 Claims, 7 Drawing Sheets

(51) Int. Cl.
G06K 9/00 (2006.01)
G06K 9/62 (2006.01)

(52) U.S. Cl.
CPC .. G06K 9/6255 (2013.01); *G06T 2207/10056* (2013.01); *G06T 2207/20021* (2013.01)

(56) References Cited

U.S. PATENT DOCUMENTS

| | | | | |
|---|---|---|---|---|
| 2015/0241330 A1* | 8/2015 | Knox | .................. | G08B 17/125 356/338 |
| 2015/0302237 A1* | 10/2015 | Ohya | ........................ | G06T 7/62 382/133 |
| 2016/0048963 A1* | 2/2016 | Piestun | .................... | G06K 9/00 382/154 |
| 2018/0286074 A1* | 10/2018 | Lee | ........................... | G06T 7/74 |

FOREIGN PATENT DOCUMENTS

| WO | 2017/056130 A1 | 4/2017 | | |
|---|---|---|---|---|
| WO | WO-2019230636 A1 * | 12/2019 | ............. | G01N 15/02 |

OTHER PUBLICATIONS

Written opinion for PCT Application No. PCT/JP2017/032832.
Japanese Office Action for JP Application No. 2020-511840 dated Apr. 13, 2021 with English Translation.

* cited by examiner

IMAGE PROCESSING DEVICE, IMAGE PROCESSING METHOD AND STORAGE MEDIUM

This application is a National Stage Entry of PCT/JP2017/032832 filed on Sep. 12, 2017, the contents of all of which are incorporated herein by reference, in their entirety.

TECHNICAL FIELD

The present invention is related to an image processing technology.

BACKGROUND ART

In microscopic particle position estimation by using an exemplar based method, the positions of overlapping particles on microscopic images are estimated. The observation of positions of overlapping particles within a distance less than the wavelength of the light source is difficult because of the Abbe diffraction limit. The exemplar based method is one of the ways to solve this optical problem.

In the exemplar based method, a dictionary (i.e. database) which contains microscopic particle images and their known particle positions is included in the system, in order to provide information for particle position estimation on input microscopic images.

When a microscopic image is input into the system, the image may be divided into images of clusters of overlapping particles. Each of the clusters is matched with the images in the dictionary. The positions of the particles on each of the clusters are estimated by using the known particle positions on the most similar image from the dictionary.

PTL 1 discloses a technology of estimating a distance between two particles in an image.

CITATION LIST

Patent Literature

[PTL 1] PCT International Application Publication No. WO2017/056130

SUMMARY OF INVENTION

Technical Problem

The technology of PTL 1 is able to be used for estimating particle positions on an image, assuming the dictionary containing the suitable density (density being similar to the input image), but PTL 1 does not disclose estimation of particle density on the input image.

Particle density varies across the input microscopic image. The input microscopic image is divided into clusters of overlapping particles before the particle positions are estimated. To estimate the particle positions on the clusters correctly, a dictionary which contains the same/similar particle density as the cluster under investigation is needed.

However, it is computationally heavy and impractical to prepare dictionaries at all particle densities. Therefore, dictionaries at all particle densities are not available for matching the input microscopic images having varying densities. It is also computationally heavy to store and process dictionaries at all densities.

Solution to Problem

An image processing device according to an exemplary aspect of the present invention includes: division means for extracting a cluster image including a cluster of particles from a particle image; estimation means for estimating particle density of the cluster image; synthesis means for determining numbers based on the particle density, and synthesizing a second dictionary image from first dictionary images having densities each being equal to the numbers, the first dictionary images being images of particles of which positions is obtained; matching means for matching the second dictionary image with the partial image, and determining positions of particles in the cluster image based on a result of the matching and the positions of particles of the first dictionary images; and output means for outputting the determined positions of particles.

An image processing method according to an exemplary aspect of the present invention includes: extracting a cluster image including a cluster of particles from a particle image; estimating particle density of the cluster image; determining numbers based on the particle density, and synthesizing a second dictionary image from first dictionary images having densities each being equal to the numbers, the first dictionary images being images of particles of which positions is obtained; matching the second dictionary image with the partial image, and determining positions of particles in the cluster image based on a result of the matching and the positions of particles of the first dictionary images; and outputting the determined positions of particles.

A computer readable storage medium according to an exemplary aspect of the present invention stores a program causing a computer to execute: division processing of extracting a cluster image including a cluster of particles from a particle image; estimation processing of estimating particle density of the cluster image; synthesis processing of determining numbers based on the particle density, and synthesizing a second dictionary image from first dictionary images having densities each being equal to the numbers, the first dictionary images being images of particles of which positions is obtained; matching processing of matching the second dictionary image with the partial image, and determining positions of particles in the cluster image based on a result of the matching and the positions of particles of the first dictionary images; and output processing of outputting the determined positions of particles. An exemplary aspect of the present invention is achieved by the program stored in the computer readable medium described above.

Advantageous Effects of Invention

The exemplary aspect of the present invention is capable of reducing computer resources required for estimating particle positions in an image.

DESCRIPTION OF EMBODIMENTS

First Example Embodiment

A first example embodiment of the present invention will be explained in detail with reference to drawings.

Figure 1:
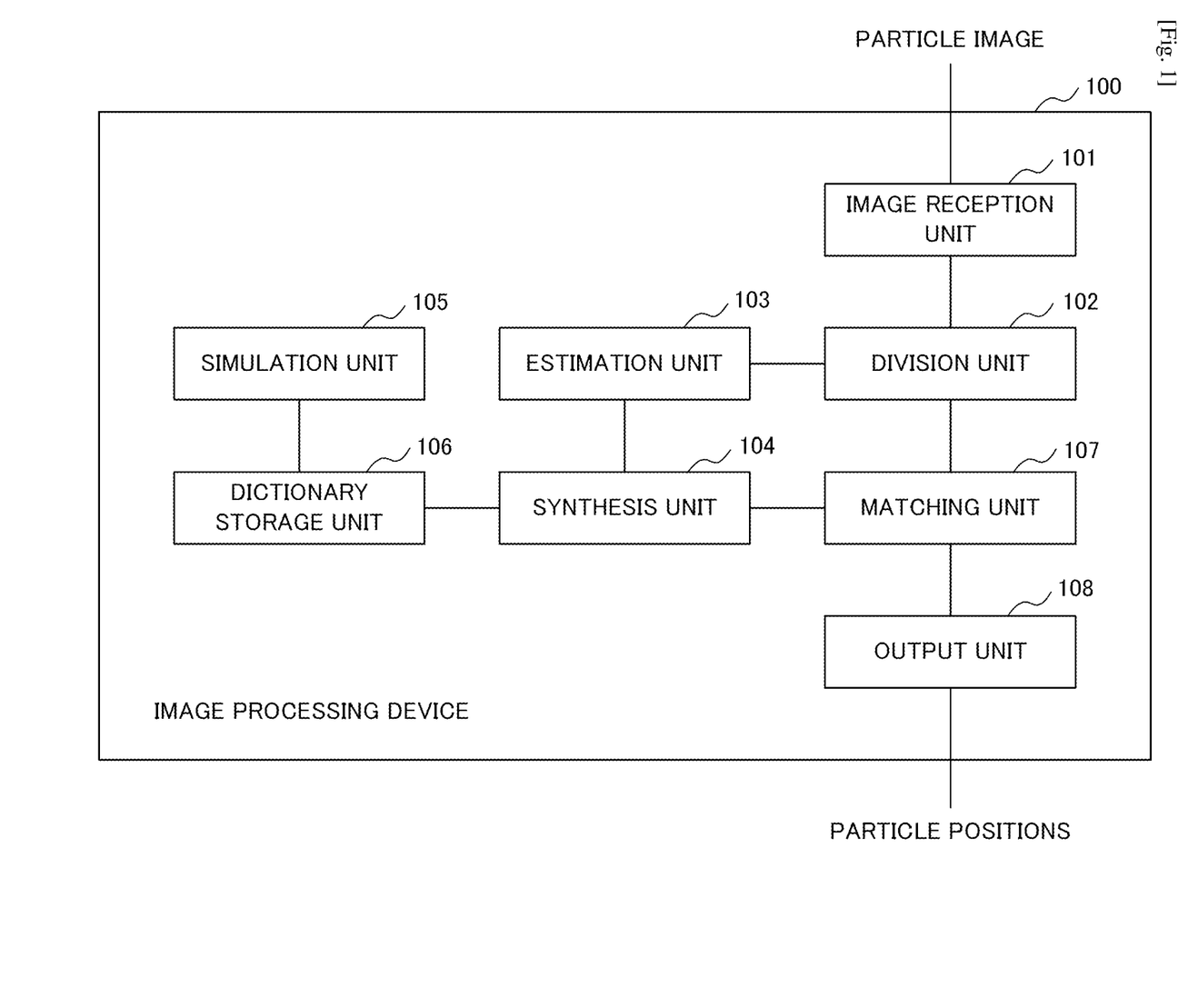
FIG. 1 is a block diagram showing an example configuration of image processing devices according to a first example embodiment and a second example embodiment of the present invention.

FIG. 1 is a block diagram showing an example configuration of an image processing device 100 according to the first example embodiment of the present invention.

The image processing device 100 includes an image reception unit 101, a division unit 102, an estimation unit 103, a synthesis unit 104, a simulation unit 105, a dictionary storage unit 106, a matching unit 107 and an output unit 108.

The image reception unit 101 receives a particle image, e.g. an observed microscopic image of particles. A particle of the particle image overlaps with another particle. More specifically, an area of a particle in the particle image may overlap with an area of another particle in the particle image. A distance between particles may be less than a half of a wavelength of a light emitted by a light source. In such cases, a distance between the particles may not be determined on the basis of the observed microscopic image obtained using such a light source due to the Abbe diffraction limit. The received particle image is also referred to as an input particle image.

The division unit 102 divides the received particle image (e.g. an observed microscopic image) into cluster images each of which is an image of a cluster of particles. A cluster of particles is a group of particles each of which overlaps with at least one particle included in the group of particles. A cluster of particles may be one particle. Each of the cluster image may be an image including an area of a cluster of particles. The area(s) of a cluster(s) of particles may be referred to as "cluster area(s)". The division unit 102 may divide a cluster area in the received particle image into two or more cluster areas each being included in different cluster images. The division unit 102 may extract one or more cluster images from the received particle image. A cluster image is referred to as a partial image. The size of cluster images may be a predetermined size, such as a size corresponding to an area of one micron square in a field where particles observed by a microscope exist.

The estimation unit 103 estimates particle density that is density of particles in a cluster image including a cluster of particles. The density of particles is also referred to as "particle density". An image of a certain particle density indicates an image in which density of particles is the certain particle density. An image having a certain particle density also indicates an image in which density of particles is the certain particle density. The particle density of a cluster image may be the number of particles included in the cluster image. The estimation unit 103 may estimate a particle density on the basis of a result of machine learning for estimating a particle density from a cluster image or a feature extracted from the cluster image. The method of machine learning may be selected from various existing methods of machine leaning. The estimated particle density may be indicated by an integer. The estimated particle density may not be indicated by an integer. When the estimated particle density is not indicated by an integer, the estimation unit 103 may round off the estimated particle density to an integer. In the present example embodiment, the estimated particle density is an integer.

It is known that any positive integer can be represented by a sum of nonconsecutive Fibonacci numbers as shown in a Fibonacci Representation of Math. 1. It is also known that such a Fibonacci Representation requires the fewest number of Fibonacci numbers for summation to represent any positive integer. Therefore, when synthesizing a particle image of a particle density that is rounded up to a positive integer from particle images of other particle densities, particle images of densities represented by values of Fibonacci numbers can reduce and minimize the number of particle images used for synthesizing a particle image of the density of the positive integer.

$$n = \sum_{k=1}^{L} \varepsilon_k F_k \qquad \text{[Math. 1]}$$

where $\varepsilon_k$ is 0 or 1, with $\varepsilon_k \varepsilon_{k+1}=0$,
n is a positive integer,
L is the number of Fibonacci numbers to be used, and
$F_k$ is k-th Fibonacci number.

The simulation unit 105 generates particle images which have particle densities of values of Fibonacci numbers (1, 2, 3, 5, 8, 13 ... particles/micron$^2$). The Fibonacci numbers in the present example embodiment are included in a partial sequence of the Fibonacci sequence. In the description of the present example embodiment, the first Fibonacci number is one, the second Fibonacci number is two, the third Fibonacci number is three, and the fourth Fibonacci number is five, for example. The simulation unit 105 may generate the particle images according to a predetermined method of generating particle images at a predetermined densities of particles. The simulation unit 105 may randomly determine the positions of particles in the generated particle images. The simulation unit 105 may determine the positions of particles as follows. The simulation unit 105 may generate particle images including particle areas at the determined particle positions.

The simulation unit 105 may generate a particle image with one particle centered in the particle image corresponding to an area of one micron for the Fibonacci number of one. The position of the particle is not limited to the center of the particle image.

The simulation unit 105 may generate below-described particle images with two particles for the Fibonacci number of two.

The simulation unit 105 may determine candidate positions of a particle to be at the predetermined intervals in a horizontal direction and in a vertical direction. The predetermined intervals may be smaller than a radius of an area of a particle in the particle images. The simulation unit 105 may determine the position of the first particle of the two particles in the candidate positions. The simulation unit 105 may determine the position of the second particle of the two particles in the candidate positions. The simulation unit 105 may generate a particle image which includes an area of a particle at the position of the first particle and an area of a particle at the position of the second particle. The simulation unit 105 may repeat generating a particle image for each of the candidate position as the position of the first particle for each of the candidate position as the position of the second particle.

The position of the first particle of the two particles may be fixed in the particle images for the Fibonacci number of two. The position of the first particle may be the center of the particle images. The position of the first particle may be upper-left of the particle images. The position of the first particle is not limited to the above examples. The position of the second particle of the two particles may be on a predetermined straight line passing through the position of the first particle in each of the particle images for the Fibonacci number of two. The simulation unit 105 may determine distances of the second particle from the first particle in the particle images to be at predetermined intervals. The straight line may be a horizontal line in the particle images. The straight line is not limited to the horizontal line. The predetermined intervals may be smaller than a radius of an area of a particle in the particle images. The simulation unit 105 may generate particle images each of which includes an area of a particle at the position of the first particle and an area of a particle at one of the positions of the second particle.

The simulation unit 105 may generate particle image with three particles for the Fibonacci number of three by using the particle images for the Fibonacci number of two. The simulation unit 105 may select a particle image from the particle images for the Fibonacci number of two.

The simulation unit 105 may determine the positions of the third particle in the particle images to be at one of the positions at the predetermined intervals in the horizontal direction and in the vertical direction. The predetermined intervals in horizontal direction may be different from the predetermined intervals in the vertical direction. The simulation unit 105 may generate an image that is the selected image to which an area of a particle is added at the determined position as a particle image of the Fibonacci number of three.

The simulation unit 105 may determine candidate positions of a particle to be at the predetermined intervals in a horizontal direction and in a vertical direction. The simulation unit 105 may generate particle images for the Fibonacci number of three on the basis of the candidate positions and the particle images of the Fibonacci number of two as follows.

The simulation unit 105 may select a particle image from the particle images for the Fibonacci number of two, and select a candidate position from the determined candidate positions. The simulation unit 105 may generate a particle area of the third particle at the selected candidate position in the selected particle image, and may set the selected particle image in which the particle area is generated as a particle image for the Fibonacci number of three, thereby generating a particle image for the Fibonacci number of three. The simulation unit 105 may repeat generation of a particle image for each of the candidate positions for each of the particle images of the Fibonacci number of two.

The simulation unit 105 may generate particle images for the k-th Fibonacci number (i.e. $F_k$) on the basis of the candidate positions of a particle and particle images for the (k-1)-th Fibonacci number (i.e. $F_{k-1}$). The simulation unit 105 may repeat generation of a particle image for each set of $F_k$-$F_{k-1}$ candidate positions selected from the candidate positions for each of the particle image for the (k-1)-th Fibonacci number.

In this case, the simulation unit 105 may select a set of $F_k$-$F_{k-1}$ candidate positions from the determined candidate positions, may generate $F_k$-$F_{k-1}$ particle areas at positions included in the set of $F_k$-$F_{k-1}$ candidate positions in a particle image selected from the particle images for the k-th Fibonacci number, and may set, as a particle image for the (k-1)-th Fibonacci number, the particle image in which the $F_k$-$F_{k-1}$ particle areas are generated.

It can be described that the simulation unit 105 generates dictionary images of densities of particles and the densities are indicated by numbers included in a predetermined set of numbers. In the present example embodiment, the predetermined set of numbers is the first to the L-th Fibonacci numbers. The method of generating particle images is not limited to the above-described examples.

The simulation unit 105 stores the generated particle images and data of the positions of particles in the dictionary storage unit 106 as dictionary images. Storing data of the positions may be referred to as storing the positions. Each of the positions of the particles in a dictionary image is represented by coordinates in a coordinate system (e.g. two-dimensional coordinate system) assigned to the dictionary image. The origin of the coordinate system is fixed on the dictionary image. The origin of the coordinate system assigned to a dictionary image may be the upper-left point of the dictionary image. The coordinate system assigned to the dictionary image and the origin of the coordinate system are not limited to the above example.

The dictionary storage unit 106 stores the dictionary images generated by the simulation unit 105, and provides the stored dictionary images for the synthesis unit 104. The dictionary storage unit 106 further stores data of positions of particles for each of the dictionary images. Data including a dictionary image and data of positions of particles in the dictionary data is referred to as dictionary data. The dictionary data may include particle density of the dictionary image. The dictionary storage unit 106 stores dictionary data for each of the dictionary image.

The synthesis unit 104 determines numbers on the basis of the estimated particle density. In other words, the synthesis unit 104 determines numbers equal to an integer based on the estimated particle density. The synthesis unit 104 may synthesize a dictionary image from dictionary images of particle densities each indicated by the determined numbers. As described later, the numbers are Fibonacci numbers in the present example embodiment.

More specifically, the synthesis unit 104 synthesizes dictionary images of particle density equal to the estimated particle density when the dictionary images of particle density equal to the estimated particle density are not stored in the dictionary storage unit 106. The synthesis unit 104 sends the synthesized dictionary images to the matching unit 107. When the dictionary images of particle density equal to the estimated particle density are stored in the dictionary storage unit 106, the synthesis unit 104 may read out the dictionary images of particle density equal to the estimated particle density from the dictionary storage unit 106. The synthesis unit 104 may send the read dictionary images to the matching unit 107. The detailed description of the synthesis unit 104 is as follows.

When the estimated particle density of a cluster image is not equal to any one of the Fibonacci numbers, the synthesis unit 104 determines densities (i.e. determined densities) of particles of the dictionary images which are used for synthesizing a dictionary image of a density that is the same as the estimated particle density in the cluster image extracted from the input particle image. More specifically, the synthesis unit determines, in accordance with an existing calculation method such as a greedy algorithm, Fibonacci numbers whose summation is equal to an integer indicating the estimated particle density of the cluster image to be integers indicating the particle densities of the dictionary image used for synthesizing a dictionary image whose density is the estimated particle density.

In the following description, densities whose summation is equal to the estimated particle density is referred to as member densities. It can be said that the synthesis unit 104 of the present example embodiment determines values of member densities for the estimated densities from among the Fibonacci numbers.

The synthesis unit 104 determines particle images (i.e. dictionary images) to be used for synthesizing the dictionary image of the estimated particle density. More specifically, the synthesis unit 104 may designate a dictionary image from dictionary images of particle density equal to a Fibonacci number. The synthesis unit 104 may repeat designation of a dictionary image for each of the determined Fibonacci numbers.

The synthesis unit 104 reads out the determined particle images of the determined densities of particles from the dictionary storage unit 106. The synthesis unit 104 synthesizes, as a dictionary image, a particle image of the estimated particle density from the particle images which are read out. As described above, the estimated particle density is particle density estimated to be the density of particles in a cluster image. Specifically, the synthesis unit 104 may generate, as a dictionary image, an image including every areas of particles included in the dictionary images used for synthesizing the image. The synthesis unit 104 may determine a cluster number (i.e. the number of clusters of particles) in a generated dictionary image. The synthesis unit 104 may extract a connected region including area of one or more particles from the synthesized dictionary image by using an existing image processing technique. The synthesis unit 104 may determine a connected region by using particle positions of the dictionary images from which the synthesized dictionary image is synthesized and a normal size of an area of a particle in the dictionary images. The synthesis unit 104 may count the number of connected regions as the cluster number. When the determined cluster number of the synthesized dictionary image is more than one, the synthesis unit 104 may discard the synthesized dictionary image.

The synthesis unit 104 sends the synthesized dictionary image to the matching unit 107. The synthesized dictionary images are also referred to as on-the-fly dictionaries and on-the-fly dictionary images.

The synthesis unit 104 may repeat synthesizing a dictionary image and sending the synthesized dictionary image to the matching unit 107 for each possible set of dictionary images of the determined densities of particles.

The synthesis unit 104 may synthesize dictionary images of similar particle density, i.e. particle density similar to the estimated particle density, when the dictionary images of the similar particle density is not stored in the dictionary storage unit 106. When the dictionary images of the similar particle density is stored in the dictionary storage unit 106, the synthesis unit may read out dictionary images of the similar particle density from the dictionary storage unit 106 and send the read dictionary images to the matching unit 107. The similar density may be a density whose difference from the estimated particle density is within a threshold. The difference between the estimated particle density and the density similar to the estimated particle density may be few particles (e.g. one, two or three particles) per unit area. The density similar to the estimated particle density is not limited to the above-described example. The range of the density similar to the estimated particle density may be defined in advance.

In detail, when the similar particle density is not equal to any one of the Fibonacci numbers, the synthesis unit 104 determines densities of particles of the dictionary images which are used for synthesizing a dictionary image of a density that is the same as the similar particle density. More specifically, the synthesis unit 104 determines Fibonacci numbers whose summation is equal to the similar particle density to be the particle densities of the dictionary image used for synthesizing a dictionary image whose density is the estimated particle density.

The synthesis unit 104 may read out particle images of the determined densities of particles from the dictionary storage unit 106. The synthesis unit 104 may synthesize, from the dictionary image which are read out, a particle image of the similar particle density. The synthesis unit 104 may further repeat synthesizing a particle image for each set of particle images of the determined densities of particles.

The synthesis unit 104 sends the synthesized dictionary images to the matching unit 107. The synthesized dictionary images are also referred to as on-the-fly dictionaries.

When the value indicating the estimated particle density of particles is equal to any one of the Fibonacci numbers, the synthesis unit 104 may not synthesize dictionary images of the estimated particle density. In this case, the synthesis unit 104 may read out the dictionary images of the estimated particle density from the dictionary storage unit 106, and send the dictionary images read out from the dictionary storage unit 106 as the synthesized dictionary images to the matching unit 107. When the value indicating the density similar to the estimated particle density is equal to any one of the Fibonacci numbers, the synthesis unit 104 may not synthesize dictionary images of the estimated particle density also. In this case, the synthesis unit 104 may also read out the dictionary images of a density similar to the estimated particle density from the dictionary storage unit 106, and send the dictionary images read out from the dictionary storage unit 106 as the synthesized dictionary images to the matching unit 107. The synthesis unit 104 may determine a cluster number in a read dictionary image in the same way as the synthesis unit 104 determines a cluster number in the synthesized dictionary. When the determined cluster number of the read dictionary image is more than one, the synthesis unit 104 may not send the read dictionary image to the matching unit 107.

The synthesis unit 104 may receive a request for particle positions of a dictionary image.

When the dictionary image whose particle positions are requested by the request is a synthesized dictionary image, the synthesis unit 104 determines particle positions in a synthesized dictionary image by using the particle positions of the dictionary images from which the synthesized dictionary image is synthesized. More specifically, the synthesis unit 104 may read out particle positions of the dictionary images from which the synthesized dictionary image is synthesized from the dictionary storage unit 106. The synthesis unit 104 may unify data of the particle positions of the dictionary images from which the synthesized dictionary image is synthesized into data of the particle positions of the synthesized dictionary image. The synthesis unit 104 may consider data of the particle positions of the dictionary images from which the synthesized dictionary image is synthesized as data of the particle positions of the synthesized dictionary image.

When the dictionary image whose particle positions are requested by the request is a dictionary image stored in the dictionary storage unit 106, the synthesis unit 104 reads out data of particle positions of the dictionary image whose particle positions are requested by the request.

The synthesis unit 104 may send the data of particle positions requested by the request to the matching unit 107.

The synthesis unit 104 may determine, for each of the synthesized dictionary images, particle positions in a synthesized dictionary image by using the particle positions of the dictionary images from which the synthesized dictionary image is synthesized.

The synthesis unit 104 may read out particle positions of the dictionary images of the estimated particle density from the dictionary storage unit 106.

As described above, the synthesis unit 104 may send the data of the particle positions of the dictionary image when receiving a request for the particle positions of the dictionary image from the matching unit 107. The synthesis unit 104 may send, without receiving a request for the particle positions, the data of the particle positions of the synthesized dictionary image when sending the dictionary image. The synthesis unit 104 may send the data of the particle positions of the dictionary image together with the dictionary image. The synthesis unit 104 may send the data of the particle positions of the dictionary image separately from the dictionary image.

The matching unit 107 receives a cluster image including an area of a cluster of particles from the division unit 102. The matching unit 107 receives dictionary images from the synthesis unit 104. The received dictionary image may include synthesized dictionary images. The matching unit 107 further receives the data of the particle positions of the dictionary images from the synthesis unit 104. The matching unit 107 may send a request for particle positions of the dictionary image most suitably matching with the cluster image, and may receive the data of the particle positions of the dictionary image most suitably matching with the cluster image.

The matching unit 107 matches (i.e. performs matching) the cluster image with each of the received dictionary images. The matching unit 107 may search, by template matching, a range of relative position between the cluster image and each of the received dictionary images for a position at which the cluster image most suitably matches with any of the synthesized dictionary images. The matching unit 107 determines the dictionary image that most suitably matches the cluster image including a cluster and the relative position at which the dictionary image that most suitably matches the cluster image. The matching unit 107 may determine positions of particles included in the cluster of the cluster image on the basis of the relative position of the dictionary image and the positions of particles in the dictionary image that most suitably matches the cluster image.

As described above, the particle positions (i.e. the positions of the particles) in the dictionary image are represented by coordinates in the coordinate system assigned to the dictionary image. The relative position may be represented by a translation from an origin of a coordinate system assigned to the cluster image to a point which is in the coordinate system assigned to the cluster image and corresponds to an origin of a coordinate system assigned to the dictionary image at the relative position. The matching unit 107 may first calculate coordinates, in the coordinate system assigned to the cluster image, of the positions of particles in the dictionary image at the relative position at which the dictionary image most suitably matches with the cluster image. The matching unit 107 may calculate coordinates, in the coordinate system assigned to the input particle image, of the positions of the particles from the calculated coordinates in the coordinate system assigned to the cluster image on the basis of the relation between the coordinate system assigned to the cluster image and the coordinate system assigned to the input particle image.

The relation between the coordinate system assigned to the cluster image and the coordinate system assigned to the input particle image may be represented by a translation from the origin of the coordinate system assigned to the input particle image to a point corresponding to the origin of the coordinate system assigned to the cluster image. The translation is represented by the coordinates of the point corresponding to the origin of the coordinate system assigned to the cluster image in the coordinate system assigned to the input particle image. The matching unit 107 may calculate, as the translation, coordinates of the point corresponding to the origin of the coordinate system assigned to the cluster image in the coordinate system assigned to the input particle image on the basis of the position, in the input particle image, at which the cluster image is extracted and the position, in the cluster image, of the origin of the coordinate system assigned to the cluster image.

The matching unit 107 estimates positions of particles in the input particle image on the basis of the positions of particles in the dictionary images each most suitably matching with cluster images and relative positions of the dictionary image to the cluster images.

More specifically, the matching unit 107 calculates coordinates of the positions of particles in the coordinate system assigned to the input particle image from the coordinates of the positions of the particles in the coordinate system assigned to the cluster image on the basis of the relation between the coordinate system assigned to the cluster image and the coordinate system assigned to the input cluster image. In the above-described case, the matching unit 107 may add a vector indicating the translation to a vector indicating the coordinates of the positions of particles in the coordinate system assigned to the cluster image, thereby calculate the coordinates of the positions of particles in the coordinate system assigned to the input particle image.

The matching unit 107 may rotate a dictionary image when searching for the most suitable relative position. In this case, the matching unit 107 may determine the dictionary image that most suitably matches the cluster image including a cluster, and a rotation and a relative position at which the dictionary image most suitably matches with the cluster image including a cluster.

In this case, the matching unit 107 estimates positions of particles in the input particle image on the basis of the positions of particles in the dictionary images each most suitably matching with cluster images and rotations and relative positions of the dictionary image to the cluster images. More specifically, the matching unit 107 may calculate the coordinates of the positions of the particles in the coordinate system assigned to the cluster image from the coordinates of the positions of the particles in the coordinate system assigned to the dictionary image on the basis of the relative position and the rotation. More specifically, the matching unit 107 may apply the determined rotation to the coordinates of the positions of the particles, and then apply translation representing the determined relative position to the coordinates to which the rotation is applied. The matching unit 107 may calculate the coordinates of the particles in the coordinate system assigned to the input particle image from the coordinates of the particles in the coordinate system assigned to the cluster image in the same manner as described above.

The output unit 108 outputs estimated particle positions, i.e. the estimated positions of particles, of the input particle image, i.e. the observed microscopic image.

Figure 2:
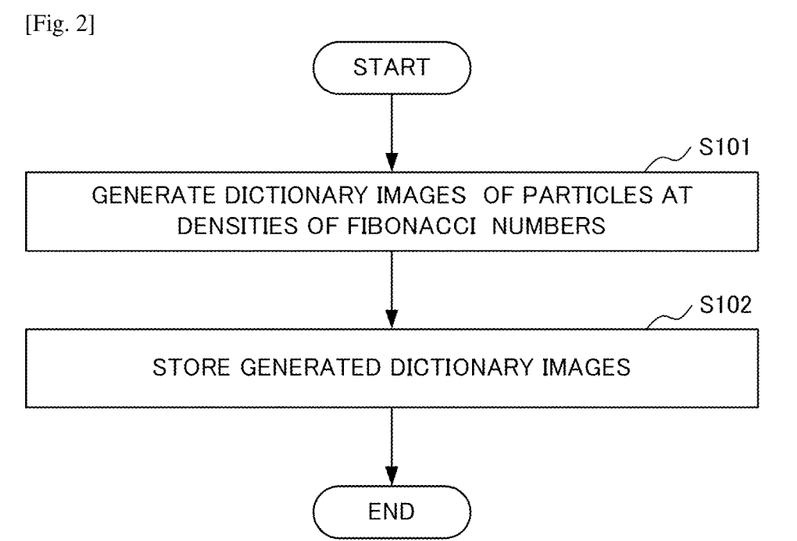
FIG. 2 is a flow chart representing an example operation in a dictionary generation phase of the image processing device according to the first example embodiment of the present invention.

FIG. 2 is a flow chart representing an example operation in a dictionary generation phase of the image processing device 100 according to the present example embodiment of the present invention.

Next, the operation of the image processing device 100 according to the present example embodiment is described in detail with reference to drawings.

Referring to FIG. 2, the simulation unit 105 generates dictionary images of particles at densities of values of Fibonacci numbers (e.g. 1, 2, 3, 5, 8, 13 . . . particles/micron$^2$) (Step S101). The simulation unit 105 may generate dictionary images of particles at a density of each of the values from the first Fibonacci number to the L-th Fibonacci number. The natural number L may be determined in advance.

The simulation unit 105 stores, in the dictionary storage unit 106, the generated dictionary images and positions of particles (i.e. the particle positions) in the generated dictionary images (Step S102). The simulation unit 105 may associate a dictionary image with particle positions of the dictionary image and store the dictionary image and particle positions in the dictionary storage unit 106 for each of the generated dictionary images. The particle positions are represented by coordinates in the coordinate system assigned to the dictionary image.

Figure 3:
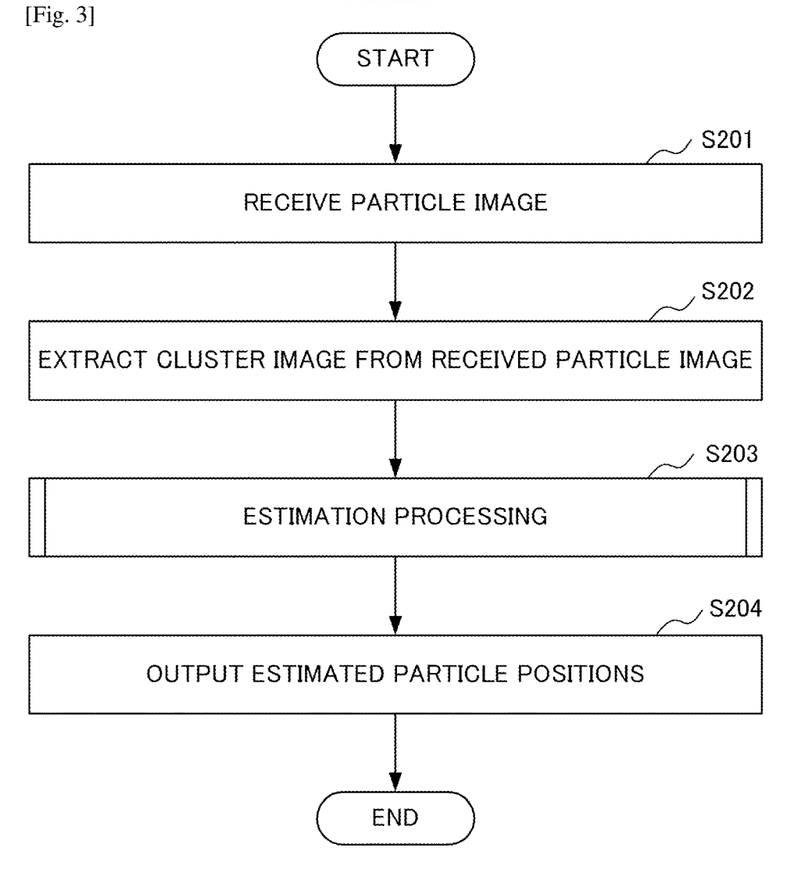
FIG. 3 is a flow chart representing an example operation in a particle position estimation phase of the image processing devices according to the first example embodiment and the second t example embodiment of the present invention.

FIG. 3 is a flow chart representing an example operation in a particle position estimation phase of the image processing device 100 according to the present example embodiment of the present invention.

Referring to FIG. 3, the image reception unit 101 receives a particle image (Step S201). The particle image may be a microscopic image of particles. The distance between two of the particles may be less than the wavelength of the light source. The distance between such two particles is not able to be determined due to Abbe diffraction limit.

The division unit 102 extracts a cluster image including a cluster of particles from the received particle image, i.e. the input particle image described above (Step S202).

The image processing device 100 estimates positions of particles included in the cluster image (Step S203). As described above, the positions of particles is referred to as particle positions. The processing of Step S203 is described in detail later.

The division unit 102 may extract a plurality of particle images from the received particle image in Step S202. In this case, the image processing device 100 may repeat the processing of Step S203 for each of the plurality of particle images.

The output unit 108 outputs the estimated particle positions (Step S204). The output unit 108 may output the estimated particle positions by displaying coordinates of the estimated positions of particles on a display. The output unit 108 may send the coordinates of the estimated positions to an apparatus such as a terminal device. The output unit 108 may superimpose marks indicating the estimated positions of particles on the received particle image, and display the particle image on which the marks are superimposed on a display. The output unit 108 may send the particle image on which the marks are superimposed to the apparatus.

Figure 4:
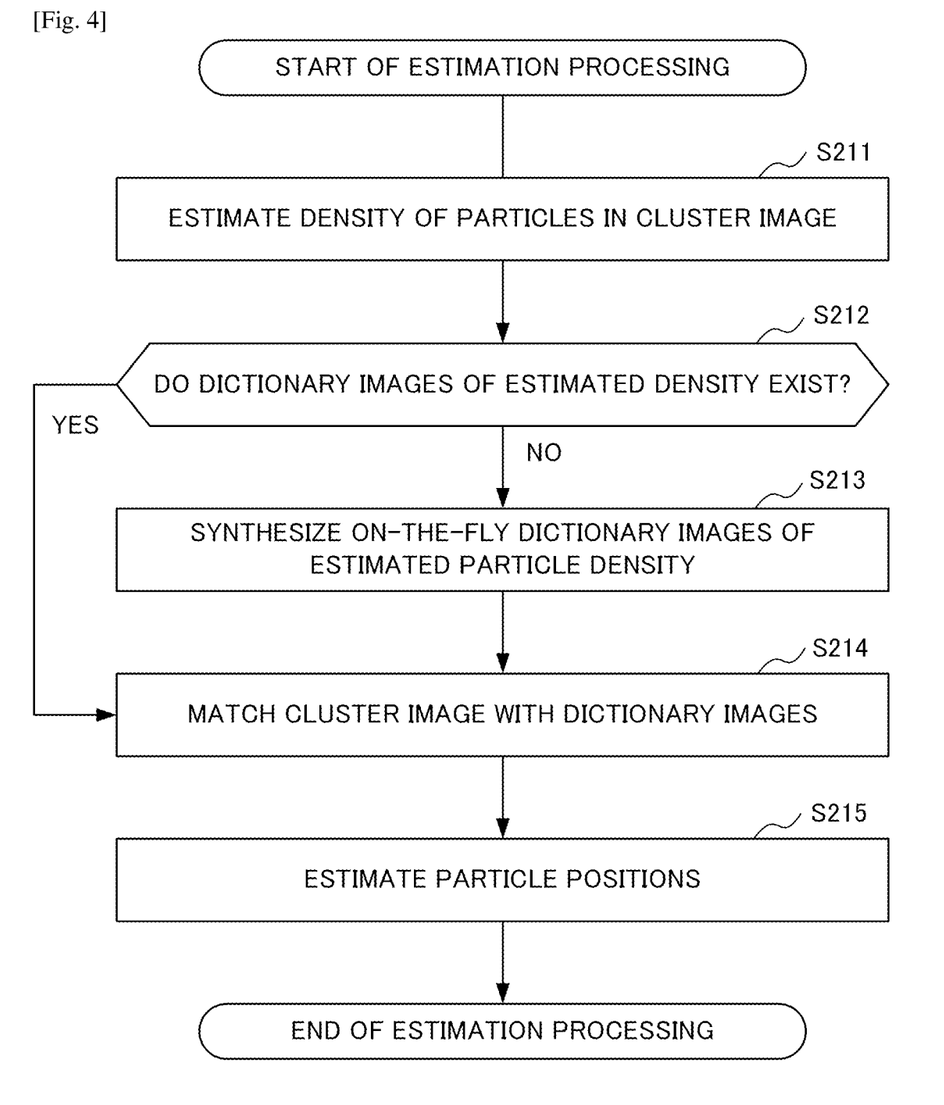
FIG. 4 is an example operation of the estimation processing of the image processing devices according to the first example embodiment and the second example embodiment of the present invention.

FIG. 4 is an example operation of the estimation processing in Step S203 of the image processing device 100 according to the present example embodiment of the present invention.

Referring to FIG. 4, the estimation unit 103 estimates density of particles in the cluster image (Step S211).

When dictionary images of estimated particle density do not exist in the dictionary storage unit 106 (NO in Step S212), the synthesis unit 104 generates dictionary images (i.e. on-the-fly dictionary images) of the estimated particle density using the dictionary images stored in the dictionary storage unit 106 (Step S213). In Step S213, the synthesis unit 104 determines Fibonacci numbers whose summary is equal to the estimated particle density, and synthesizes the dictionary image of the estimated particle density from the dictionary images of densities each being the determined Fibonacci numbers. The synthesis unit 104 sends the generated dictionary images (i.e. the on-the-fly dictionary images) to the matching unit 107.

When dictionary images of estimated particle density exist in the dictionary storage unit 106 (YES in Step S212), the synthesis unit 104 may read out the dictionary images of estimated particle density from the dictionary storage unit 106, and send the dictionary images read out from the dictionary storage unit 106 to the matching unit 107. Then the image processing device 100 executes processing in Step S214.

The matching unit 107 matches the cluster image with dictionary images which are received from the synthesis unit 104 (Step S214). In other words, the matching unit 107 searches the dictionary images for the dictionary image most suitably matching with the cluster image by using template matching, and determines the dictionary image most suitably matching with the cluster image and the relative position at which dictionary image most suitably matches with the cluster image. The matching unit 107 may further determine rotation by which the dictionary image most suitably matches with the cluster image. The determined dictionary image and relative position are referred to as "matching result". The determined dictionary image, relative position and rotation may be referred to as "matching result".

The matching unit 107 estimates the particle positions on the basis of the dictionary image determined to most suitably match with the cluster image, the determined relative position and particle positions of the dictionary image (Step S215). In other words, the matching unit 107 determines the particle positions of the cluster image on the basis of the matching result and the particle positions of the dictionary image determined to most suitably matching with the cluster image. The matching unit 107 may determine the particle positions further on the basis of the determined rotation.

The image processing device 100 of the present example embodiment is capable of reducing computer resources required for dictionary data including dictionary images and particle positions. The reason is that the synthesis unit synthesizes the on-the-fly dictionary image of the estimated particle density from first dictionary images whose particle positions are obtained. Therefore, the dictionary data for every possible particle densities is not required to be generated and stored in advance. Accordingly, storage area required for storing dictionary data is reduced.

The image processing device 100 of the present example embodiment is capable of further reducing computer resources required for dictionary data including dictionary images and particle positions. The reason is that the synthesis unit 104 determines Fibonacci numbers whose summation is equal to an integer based on the estimated particle density. It is known that any integer can be represented by Fibonacci numbers and the number of Fibonacci numbers whose summation represents an integer is reduced in comparison with a summation of numbers included in the other number sequence such as powers of two. Therefore, the number of combinations of dictionary images of densities corresponding to the determined number can be reduced, and the number of synthesized dictionary images can be reduced. Accordingly, computer resources required for synthesizing dictionary images can be reduced.

Second Example Embodiment

A second example embodiment of the present invention will be explained in detail with reference to drawings.

FIG. 1 is a block diagram showing an example of a configuration of an image processing device 100 according to the second example embodiment of the present invention. The configuration of the image processing device 100 of the present example embodiment is the same as that of the image processing device 100 of the first example embodiment except the following differences. Elements of the present example embodiment operate in the same way as the elements to which the same names and signs are assigned of the first example embodiment except the following different operations.

In summary, the simulation unit 105 and the synthesis unit 104 use powers of two instead of the Fibonacci numbers. The predetermined set of numbers described above is a set of powers of two in the present example embodiment. The simulation unit 105 of the present example embodiment is the same as the simulation unit 105 of the first example embodiment in the other points. The synthesis unit 104 of the present example embodiment is the same as the synthesis unit 104 of the first example embodiment in the other points.

The simulation unit 105 generates dictionary images of particles at densities of values of powers of two (i.e. $2^0$, $2^1$, $2^2$, ..., and $2^L$ particles/micron2). The simulation unit 105 generates a dictionary image of a density in the same manner as the simulation unit 105 of the first example embodiment generates the dictionary image of the density.

As represented in Math. 2, any positive integer can be written as a linear combination of powers of two. Therefore, any particle density that is rounded up to a positive integer can be represented by a linear combination of powers of two. Accordingly, a cluster image of any particle density can be synthesized from dictionary images whose particle densities are values of powers of two.

$n=\Sigma_{k=0}^{L}\varepsilon_k 2^k$ where $\varepsilon_k$ is 0 or 1, k is an integer equal to or greater than 0, and equal to or smaller than L, L is the largest exponent of powers of two to be used, and n is any positive integer.

When the estimated particle density is not equal to any one of the powers of two, the synthesis unit 104 determines, in accordance with an existing method, powers of two whose summation is equal to the estimated particle density in a cluster image. The binary code representing an integer indicating the estimated particle density represents the powers of two whose summation is equal to the estimated particle density. It can be described that the synthesis unit 104 of the present example embodiment determines values of member densities for the estimated densities from among the powers of two.

The synthesis unit 104 synthesizes a dictionary image (i.e. an on-the-fly dictionary image) by using dictionary images whose particle densities are the determined member densities in the same manner as the synthesis unit 104 of the first example embodiment. The synthesis unit 104 sends the synthesized dictionary image to the matching unit 107.

When the estimated particle density is equal to any one of the powers of two, the synthesis unit 104 reads out dictionary images of the estimated particle density from the dictionary storage unit 106, and sends the dictionary images read out from the dictionary storage unit 106 to the matching unit 107.

The synthesis unit 104 may synthesize a dictionary image whose particle density is similar to the estimated particle density of a cluster image. In other words, the synthesis unit 104 may synthesize a dictionary image of a similar particle density described above. In this case, when the similar particle density is not equal to any one of the powers of two, the synthesis unit 104 determines powers of two whose summation is equal to the similar particle density. The synthesis unit 104 may synthesize a dictionary image of the similar density from the dictionary images of the determined particle densities i.e. the member densities.

When the similar particle density is equal to any one of the powers of two, the synthesis unit 104 reads out dictionary images of the similar particle density from the dictionary storage unit 106, and sends the dictionary images read out from the dictionary storage unit 106 to the matching unit 107.

The operations of the image processing device 100 according to the present example embodiment is described in detail with reference to drawings.

Figure 5:
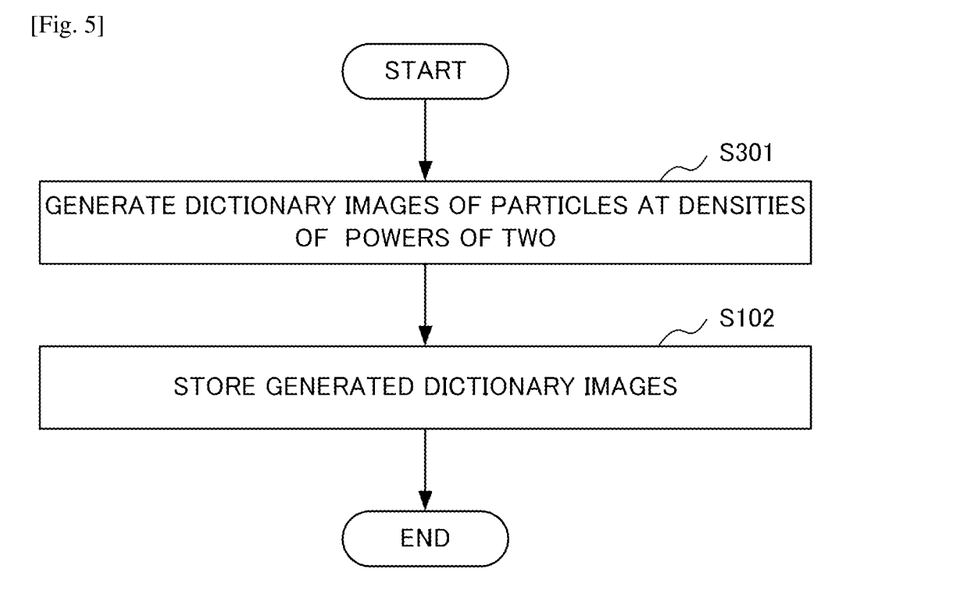
FIG. 5 is a flow chart representing an example of operation in a dictionary generation phase of the image processing device according to the second example embodiment of the present invention.

FIG. 5 is a flow chart representing an example of operation in a dictionary generation phase of the image processing device 100 according to the present example embodiment.

The simulation unit 105 generates dictionary images of particles at densities of powers of two (Step S301). The simulation unit 105 generates dictionary images for each density of power of two from two the 0th power to two to the Lth power (i.e. $2^0$, $2^1$, $2^2$, ..., $2^L$ particles/micron2).

The simulation unit 105 stores the generated dictionary images in the dictionary storage unit 106 (Step S102). The simulation unit 105 may store the above-described dictionary data including the dictionary image and positions of particles of the dictionary image in the dictionary storage unit 106.

FIG. 3 is a flow chart representing an example operation in a particle position estimation phase of the image processing device 100 according to the present example embodiment of the present invention.

In a particle position estimation phase, the image processing device 100 of the present example embodiment operates in the same manner as the image processing device except for the processing in Step S203. In Step S203, the image processing device 100 of the present example embodiment uses powers of two instead of the Fibonacci numbers.

FIG. 4 is an example operation of the estimation processing in Step S203 of the image processing device 100 according to the present example embodiment of the present invention.

The image processing device 100 of the present example embodiment operates in the same manner as the image processing device 100 of the first example embodiment in Step S211, Step S212, Step S214, and Step S215.

In Step S213, the synthesis unit 104 synthesizes dictionary images (i.e. on-the-fly dictionary images) of estimated particle density.

More specifically, the synthesis unit 104 determines powers of two whose summary is equal to the estimated particle density, and synthesizes the dictionary image of the estimated particle density from the dictionary images of densities each being the determined powers of two.

The image processing device 100 of the present example embodiment is capable of reducing computer resources required for dictionary data including dictionary images and particle positions. The reason is that the synthesis unit 104 synthesizes the on-the-fly dictionary image of the estimated particle density from first dictionary images whose particle positions are obtained. Therefore, the dictionary data for every possible particle densities is not required to be generated and stored in advance. Accordingly, storage area required for storing dictionary data is reduced.

Third Example Embodiment

The third example embodiment of the present disclosure is described in detail with reference to drawings.

Figure 6:
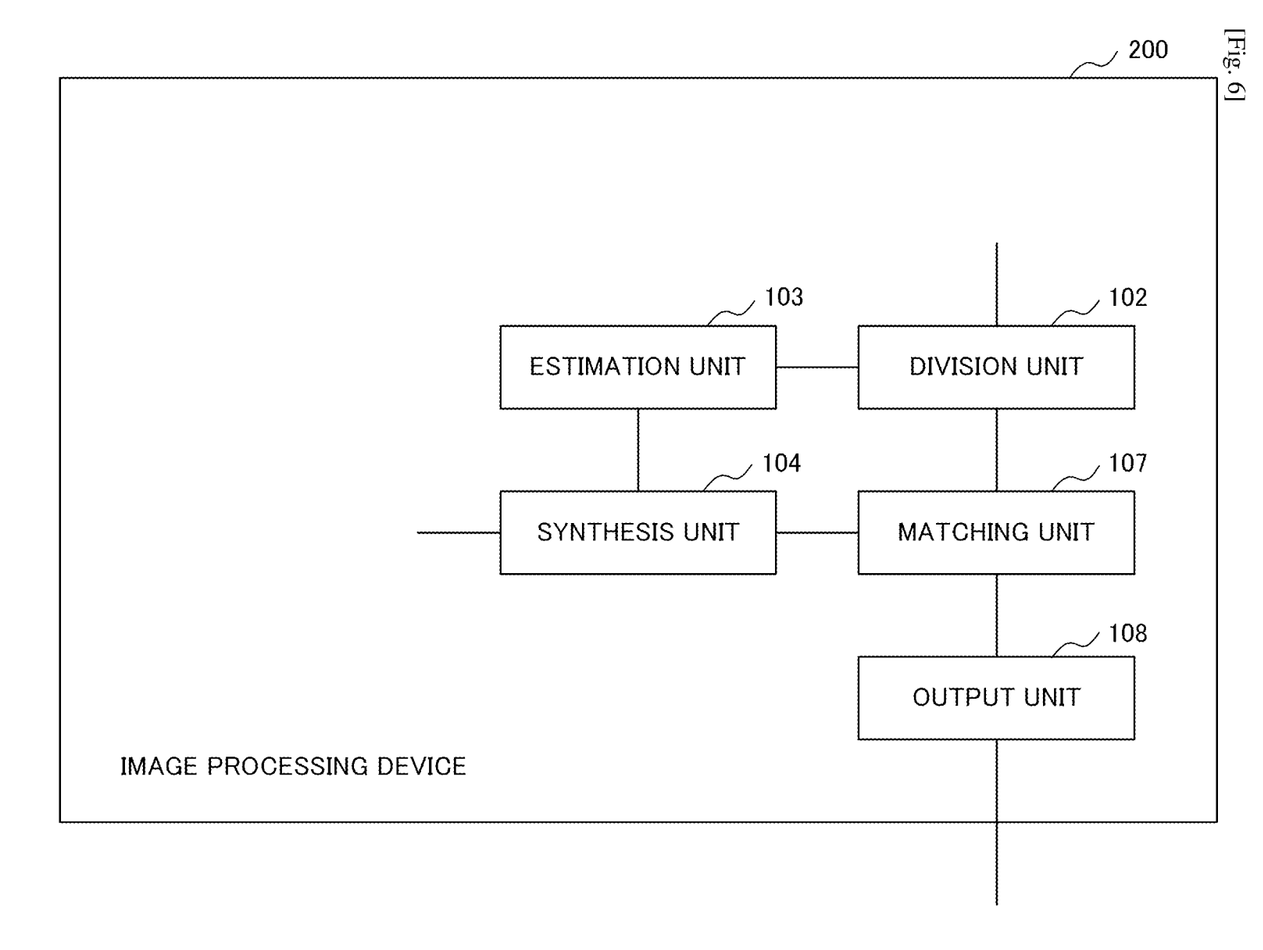
FIG. 6 is a block diagram representing an example configuration of an image processing device according to a third example embodiment of the present invention.

FIG. 6 is a block diagram representing an example configuration of an image processing device according to the present example embodiment.

The image processing device 200 of the present example embodiment includes a division unit 102, an estimation unit 103, a synthesis unit 104, a matching unit 107 and an output unit 108.

The division unit 102 extracts a cluster image including a cluster of particles from a particle image. The particle image may be a microscopic image of particles.

The estimation unit 103 estimates particle density (i.e. density of particles) of the cluster image.

The synthesis unit 104 determines numbers on the basis of the estimated particle density. In other words, the synthesis unit 104 determines numbers equal to an integer based on the estimated particle density. More specifically, the synthesis unit 104 may determine Fibonacci numbers whose summation is equal to an integer into which the estimated particle density is rounded up. The synthesis unit 104 may determine Fibonacci numbers in such a manner that the difference between the integer and summation of the determined Fibonacci numbers is within a predetermined threshold. The synthesis unit 104 may determine powers of two whose summation is equal to the integer into which the estimated particle density is rounded up. The synthesis unit 104 may determine powers of two in such a manner that the difference between the integer and summation of the determined powers of two is within a predetermined threshold.

The synthesis unit 104 synthesizes a second dictionary image from first dictionary images having densities each being equal to the determined numbers. The first dictionary images are images of particles whose density is obtained. The positions of the particles of the first dictionary images are also obtained in advance. The first dictionary images may correspond to the dictionary images stored in the dictionary storage unit 106 of the first or the second example embodiment. The first dictionary images may be extracted from microscopic images of particles. In this case, the positions of the particles in the first dictionary images may be manually determined in advance. The second image corresponds to the synthesized dictionary image of the first or the second example embodiment.

The matching unit 107 matches (i.e. performs matching) the cluster image with the second dictionary image. The matching unit 107 determines the positions of particles in the cluster image on the basis of the result of the matching and the positions of particles in the first dictionary images from which the second dictionary image is synthesized.

The output unit 108 outputs the determined position of particles (i.e. particle positions). The output unit 108 may output the determined particle positions in a text form. The output unit 108 may generate an output image that is the cluster image on which marks each indicating the particle positions are superimposed, and may output the output image. The output unit 108 may generate an output image that is the particle image on which marks each indicating the particle positions are superimposed, and may output the output image.

Figure 7:
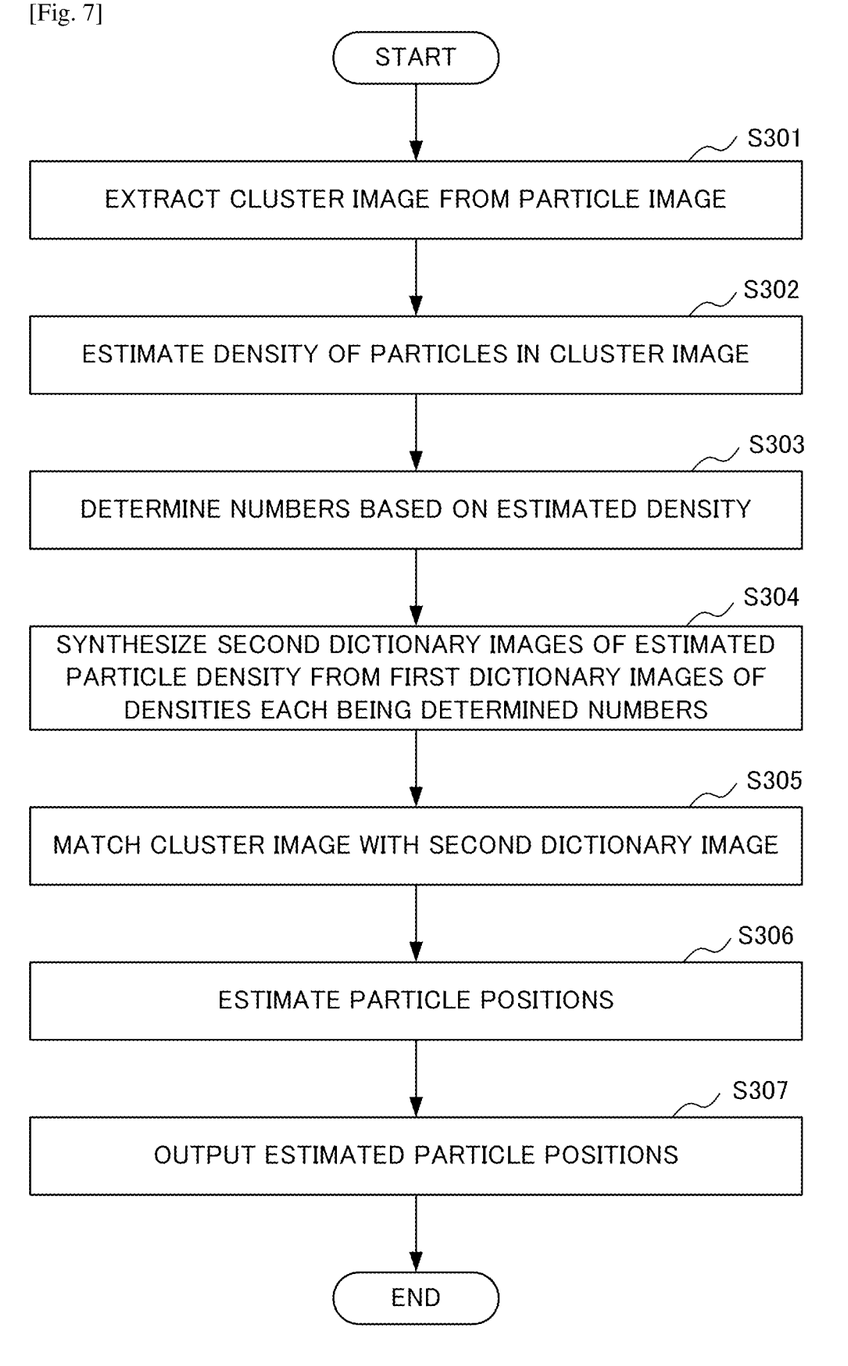
FIG. 7 is a flowchart representing an example operation of the image processing device according to the third example embodiment of the present invention.

FIG. 7 is a flowchart representing an example operation of the image processing device 200 according to the present example embodiment.

Referring to FIG. 7, the division unit 102 extracts a cluster image from a particle image (Step S301). The estimation unit 103 estimates density of particles in the cluster image (Step S302). The synthesis unit 104 determines numbers based on the estimated particle density (Step S303). The synthesis unit 104 synthesizes a second dictionary image of the estimated particle density from first dictionary images of densities each being determined numbers (Step S304). The matching unit 107 matches the cluster image with the second dictionary image (Step S305). The matching unit 107 estimates particle positions in the cluster image on the basis of the result of the matching and the positions of the first dictionary images from which the second dictionary image is synthesized (Step S306). The output unit 108 outputs the estimated particle positions (Step S307).

The image processing device 200 of the present example embodiment is capable of reducing computer resources required for dictionary data including dictionary images and particle positions. The reason is that the synthesis unit synthesizes the second dictionary image of the estimated particle density from first dictionary images whose particle positions are obtained. Therefore, the dictionary data for every possible particle densities is not required to be generated and stored in advance. Accordingly, storage area required for storing dictionary data is reduced.

Other Example Embodiment

Each of the information processing devices 100 of the first and second example embodiments and the information processing device 200 of the third example embodiment can be achieved using dedicated hardware, a computer including a memory and a processor executing a program loaded in the memory, or a combination of dedicated hardware and a computer which includes a memory and a processor executing a program loaded in the memory.

Figure 8:
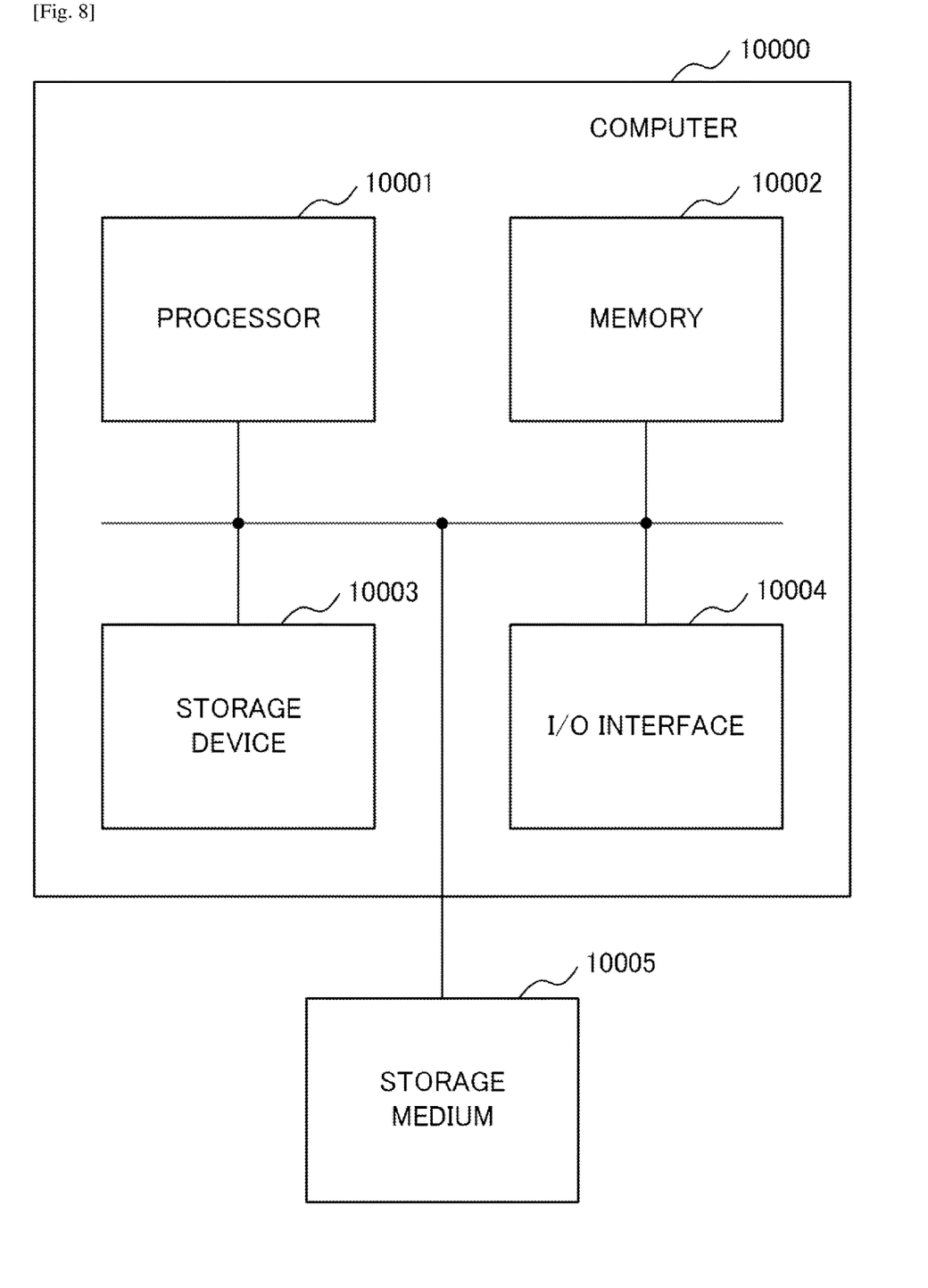
FIG. 8 is a block diagram representing an example of a hardware structure of a computer which is able to be used for achieving the information processing devices according to the example embodiments of the present invention.

FIG. 8 is a block diagram representing an example of a hardware structure of a computer 10000 which is able to be used for achieving the information processing devices according to the example embodiments of the present invention. As illustrated in FIG. 8, the computer 10000 includes a processor 10001, a memory 10002, a storage device 10003 and an I/O (Input/Output) interface 10004. The computer 10000 can access a storage medium 10005. Each of the memory 10002 and the storage device 10003 may be a storage device, such as a RAM (Random Access Memory), a hard disk drive or the like. The storage medium 10005 may be a RAM, a storage device such as a hard disk drive or the like, a ROM (Read Only Memory), or a portable storage medium. The storage device 10003 may operate as the storage medium 10005. The processor 10001 can read data and a program from the memory 10002 and the storage device 10003, and can write data and a program in the memory 10002 and the storage device 10003. The processor 10001 can communicate with a terminal device (not illustrated) and the like over the I/O interface 10004. The processor 10001 can access the storage medium 10005. The storage medium 10005 stores a program that causes the computer 10000 to operate as one of the information processing devices 100, and the information processing device 200.

The processor 10001 loads the program, which causes the computer 10000 operate as one of the information processing devices 100 and the information processing device 200, stored in the storage medium 10005 into the memory 10002. The computer 10000 operates as one of the information processing devices 100 by the processor 10001 executing the program loaded in the memory 10002.

The image reception unit 101, the division unit 102, the estimation unit 103, the synthesis unit 104, the simulation unit 105, the matching unit 107, and the output unit 108 can be achieved by using the computer 10000 including the memory 10002 and a processor 10001 executing a program loaded in the memory 10002.

The dictionary storage unit 106 can be achieved by using the storage device 10003.

The image reception unit 101, the division unit 102, the estimation unit 103, the synthesis unit 104, the simulation unit 105, the dictionary storage unit 106, the matching unit 107, and the output unit 108 can be achieved by using dedicated hardware, such as one or more dedicated circuits.

The whole or part of the example embodiments disclosed above can be described as, but not limited to, the following supplementary notes.

<Supplementary Notes>
<Supplementary Note 1>
An image processing device comprising:
division means for extracting a cluster image including a cluster of particles from a particle image;
estimation means for estimating particle density of the cluster image;
synthesis means for determining numbers based on the particle density, and synthesizing a second dictionary image from first dictionary images having densities each being equal to the numbers, the first dictionary images being images of particles of which positions is obtained;
matching means for matching the second dictionary image with the partial image, and determining positions of particles in the cluster image based on a result of the matching and the positions of particles of the first dictionary images; and
output means for outputting the determined positions of particles.
<Supplementary Note 2>
The image processing device according to Supplementary Note 1, wherein
the synthesis means determines the numbers from among a predetermined set of numbers in a manner that a difference between a summation of the numbers and an integer indicating the estimated particle density is within a threshold.
<Supplementary Note 3>
The image processing device according to Supplementary Note 1 or 2, further comprising:
simulation means for generating dictionary images of densities particles, the densities being indicated by numbers included in the predetermined set.
<Supplementary Note 4>
The image processing device according to any one of Supplementary Notes 1 to 3, wherein
the predetermined set is a set of Fibonacci numbers.
<Supplementary Note 5>
The image processing device according to any one of Supplementary Notes 1 to 3, wherein
the predetermined set is a set of powers of two.
<Supplementary Note 6>
An image processing method comprising:
extracting a cluster image including a cluster of particles from a particle image;
estimating particle density of the cluster image;
determining numbers based on the particle density, and synthesizing a second dictionary image from first dictionary images having densities each being equal to the numbers, the first dictionary images being images of particles of which positions is obtained;
matching the second dictionary image with the partial image, and determining positions of particles in the cluster image based on a result of the matching and the positions of particles of the first dictionary images; and
outputting the determined positions of particles.
<Supplementary Note 7>
The image processing method according to Supplementary Note 1, comprising
determining the numbers from among a predetermined set of numbers in a manner that a difference between a summation of the numbers and an integer indicating the estimated particle density is within a threshold.
<Supplementary Note 8>
The image processing method according to Supplementary Note 1 or 2, further comprising:
generating dictionary images of densities particles, the densities being indicated by numbers included in the predetermined set.
<Supplementary Note 9>
The image processing method according to any one of Supplementary Notes 1 to 3, wherein
the predetermined set is a set of Fibonacci numbers.
<Supplementary Note 10>
The image processing method according to any one of Supplementary Notes 1 to 3, wherein
the predetermined set is a set of powers of two.
<Supplementary Note 11>
A computer readable storage medium storing a program causing a computer to execute:
division processing of extracting a cluster image including a cluster of particles from a particle image;
estimation processing of estimating particle density of the cluster image;
synthesis processing of determining numbers based on the particle density, and synthesizing a second dictionary image from first dictionary images having densities each being equal to the numbers, the first dictionary images being images of particles of which positions is obtained;
matching processing of matching the second dictionary image with the partial image, and determining positions of particles in the cluster image based on a result of the matching and the positions of particles of the first dictionary images; and
output processing of outputting the determined positions of particles.

<Supplementary Note 12>
The computer readable storage medium according to Supplementary Note 11, wherein
the synthesis processing determines the numbers from among a predetermined set of numbers in a manner that a difference between a summation of the numbers and an integer indicating the estimated particle density is within a threshold.
<Supplementary Note 13>
The computer readable storage medium according to Supplementary Note 11 or 12, the program further causing a computer to execute:
simulation processing of generating dictionary images of densities particles, the densities being indicated by numbers included in the predetermined set.
<Supplementary Note 14>
The computer readable storage medium according to any one of Supplementary Notes 11 to 13, wherein
the predetermined set is a set of Fibonacci numbers.
<Supplementary Note 15>
The computer readable storage medium according to any one of Supplementary Notes 11 to 13, wherein
the predetermined set is a set of powers of two.

While the present invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be applied to generation of on-the-fly dictionary in microscopic particle position estimation using an exemplar based method.

In an exemplar based method for microscopic particle position estimation, a dictionary which contains microscopic particle images and known particle positions is included in the system, in order to provide information for particle position estimation on the input microscopic images.

As particle density varies across the input microscopic image, dictionaries with corresponding particle densities are needed. Generation of on-the-fly dictionaries with different particle densities can provide different dictionaries according to the particle densities of the area under investigation. As dictionaries with the same/similar particle densities as the areas under investigation are used, the particle positions on the input microscopic image can be estimated more accurately.

REFERENCE SIGNS LIST

100 Image processing device
101 Image reception unit
102 Division unit
103 Estimation unit
104 Synthesis unit
105 Simulation unit
106 Dictionary storage unit
107 Matching unit
108 Output unit
200 Image processing device

What is claimed is:
1. An image processing device comprising:
at least one memory storing a set of instructions; and
at least one processor configured to execute the set of instructions to:
extract a cluster image including a cluster of particles from a particle image;
estimate particle density of the cluster image;
determine numbers based on the particle density, and synthesize a second dictionary image from first dictionary images having densities each being equal to the numbers, the first dictionary images being images of particles of which positions is obtained;
match the second dictionary image with the particle image, and determine positions of particles in the cluster image based on a result of the matching and the positions of particles of the first dictionary images; and
output the determined positions of particles.

2. The image processing device according to claim 1, wherein
the at least one processor is further configured to execute the set of instructions to
determine the numbers from among a predetermined set of numbers in a manner that a difference between a summation of the numbers and an integer indicating the estimated particle density is within a threshold.

3. The image processing device according to claim 2, wherein
the at least one processor is further configured to execute the set of instructions to
generate dictionary images of densities particles, the densities being indicated by numbers included in the predetermined set.

4. The image processing device according to claim 2, wherein
the predetermined set is a set of Fibonacci numbers.

5. The image processing device according to claim 2, wherein
the predetermined set is a set of powers of two.

6. An image processing method comprising:
extracting a cluster image including a cluster of particles from a particle image;
estimating particle density of the cluster image;
determining numbers based on the particle density, and synthesizing a second dictionary image from first dictionary images having densities each being equal to the numbers, the first dictionary images being images of particles of which positions is obtained;
matching the second dictionary image with the particle image, and determining positions of particles in the cluster image based on a result of the matching and the positions of particles of the first dictionary images; and
outputting the determined positions of particles.

7. The image processing method according to claim 6, comprising
determining the numbers from among a predetermined set of numbers in a manner that a difference between a summation of the numbers and an integer indicating the estimated particle density is within a threshold.

8. The image processing method according to claim 7, further comprising:
generating dictionary images of densities particles, the densities being indicated by numbers included in the predetermined set.

9. The image processing method according to claim 7, wherein
the predetermined set is a set of Fibonacci numbers.

10. The image processing method according to claim 7, wherein
the predetermined set is a set of powers of two.

11. A non-transitory computer readable storage medium storing a program causing a computer to execute:
- division processing of extracting a cluster image including a cluster of particles from a particle image;
- estimation processing of estimating particle density of the cluster image;
- synthesis processing of determining numbers based on the particle density, and synthesizing a second dictionary image from first dictionary images having densities each being equal to the numbers, the first dictionary images being images of particles of which positions is obtained;
- matching processing of matching the second dictionary image with the particle image, and determining positions of particles in the cluster image based on a result of the matching and the positions of particles of the first dictionary images; and
- output processing of outputting the determined positions of particles.

12. The computer readable storage medium according to claim 11, wherein
the synthesis processing determines the numbers from among a predetermined set of numbers in a manner that a difference between a summation of the numbers and an integer indicating the estimated particle density is within a threshold.

13. The computer readable storage medium according to claim 11, the program further causing a computer to execute:
simulation processing of generating dictionary images of densities particles, the densities being indicated by numbers included in the predetermined set.

14. The computer readable storage medium according to claim 12, wherein
the predetermined set is a set of Fibonacci numbers.

15. The computer readable storage medium according to claim 12, wherein
the predetermined set is a set of powers of two.

* * * * *